(12) United States Patent
Epworth et al.

(10) Patent No.: US 6,994,509 B2
(45) Date of Patent: Feb. 7, 2006

(54) LOW PROFILE MECHANISM FOR STOWING AND DEPLOYING A CARRIAGE WITH RESPECT TO A TRUCK BOX

(76) Inventors: Larry Norman Epworth, 528375 5th Side Road, RR#2, Mansfield, Ontario (CA) L0N 1M0; Garry Albert Osborne, 403 Gifford Road, Ennismore, Ontario (CA) K0L 1T0; Ronald James Smith, 1059 Cedarwood Drive, RR#1, Verona, Ontario (CA) K0H 2W0; Ingrid Olga Smith, 1059 Cedarwood Drive, RR#1, Verona, Ontario (CA) K0H 2W0

( * ) Notice: Subject to any disclaimer, the term of this patent is extended or adjusted under 35 U.S.C. 154(b) by 180 days.

(21) Appl. No.: 10/443,433

(22) Filed: May 22, 2003

(65) Prior Publication Data

US 2004/0234366 A1    Nov. 25, 2004

(51) Int. Cl.
*B60P 1/64* (2006.01)
(52) U.S. Cl. ........................... 414/491; 414/498
(58) Field of Classification Search ............... 414/491, 414/498, 549, 546
See application file for complete search history.

(56) References Cited

U.S. PATENT DOCUMENTS

| | | | | |
|---|---|---|---|---|
| 3,819,075 | A | * | 6/1974 | Derain ..................... 414/491 |
| 4,053,074 | A | * | 10/1977 | Lemaire ................... 414/491 |
| 4,225,281 | A | * | 9/1980 | Bibeau et al. ............ 414/498 |
| 4,755,098 | A | * | 7/1988 | Wulf et al. ............... 414/546 |
| 5,232,329 | A | | 8/1993 | Livingston |
| 5,620,296 | A | | 4/1997 | McMahon et al. |
| 6,152,674 | A | | 11/2000 | Ogrodnick |
| 6,712,578 | B2 | * | 3/2004 | Chabanas et al. ........ 414/491 |

FOREIGN PATENT DOCUMENTS

| | | | |
|---|---|---|---|
| DE | 3922811 | * | 1/1991 |
| EP | 0925999 | * | 6/1999 |

* cited by examiner

*Primary Examiner*—Janice L. Krizek
(74) *Attorney, Agent, or Firm*—Alston & Bird LLP

(57) ABSTRACT

A carriage with a front end and a rear end can be stowed in a truck box or truck platform, and deployed to a position on the ground behind the truck by providing a lift apparatus having a transfer arm with one end pivoted with respect to the truck and the other end pivoted to the front end of the carriage. Guides are mounted on the lift apparatus to guide the carriage during movement. The carriage has wheels adjacent the rear end, and a powered mechanism, typically hydraulic, is adapted to move the transfer arm between its two extreme positions. As the transfer arm begins to move away from the position in which the carriage is stowed in the truck, the front end of the carriage lifts upwardly while the carriage moves rearwardly, supported and guided by roller guides, until the wheels at the rear end of the carriage contact the surface on which the truck is standing. This causes the carriage to disengage from the roller guides and eventually the carriage comes to a stop resting on the surface. The current invention is designed for use in boxes of limited length. To establish as small a footprint as possible, the lift apparatus is configured with a folding transfer arm and a retractable guide means.

27 Claims, 4 Drawing Sheets

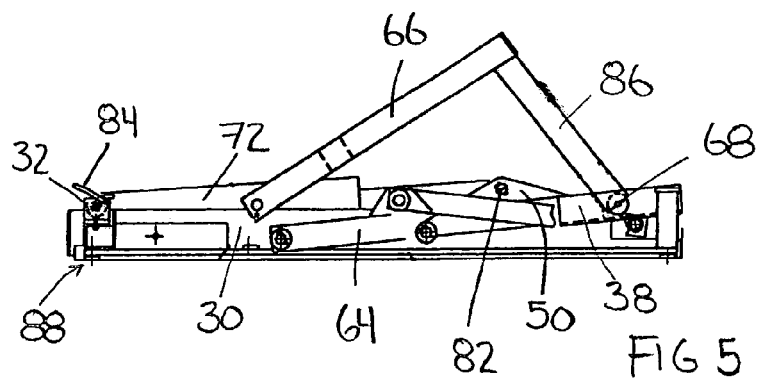
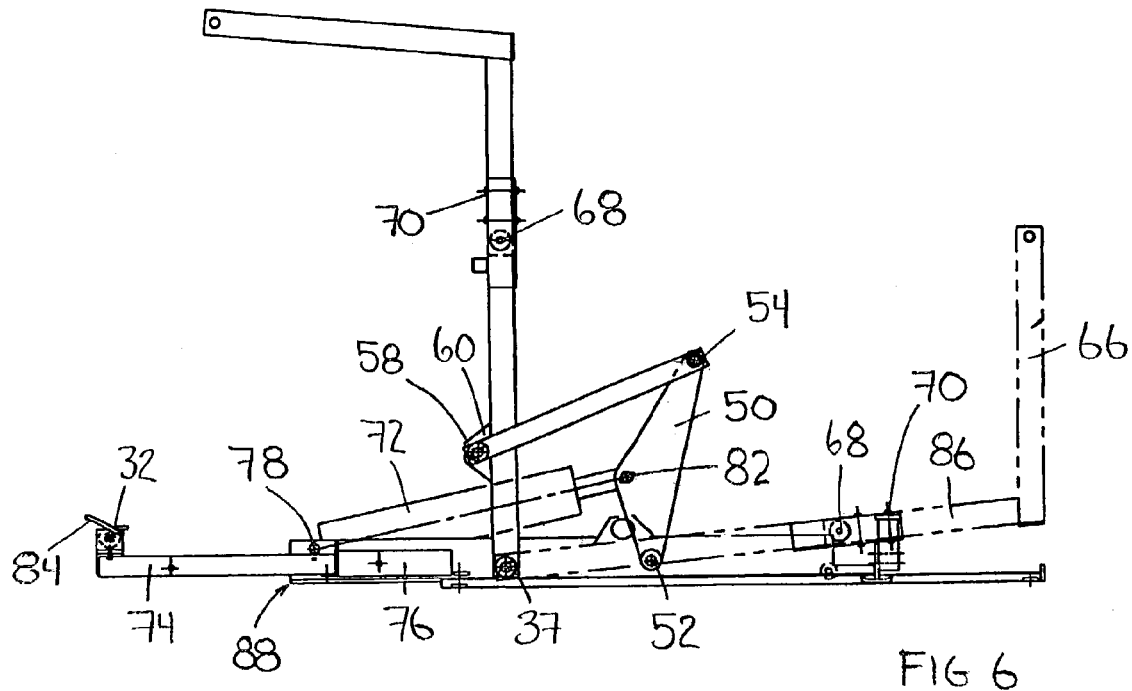
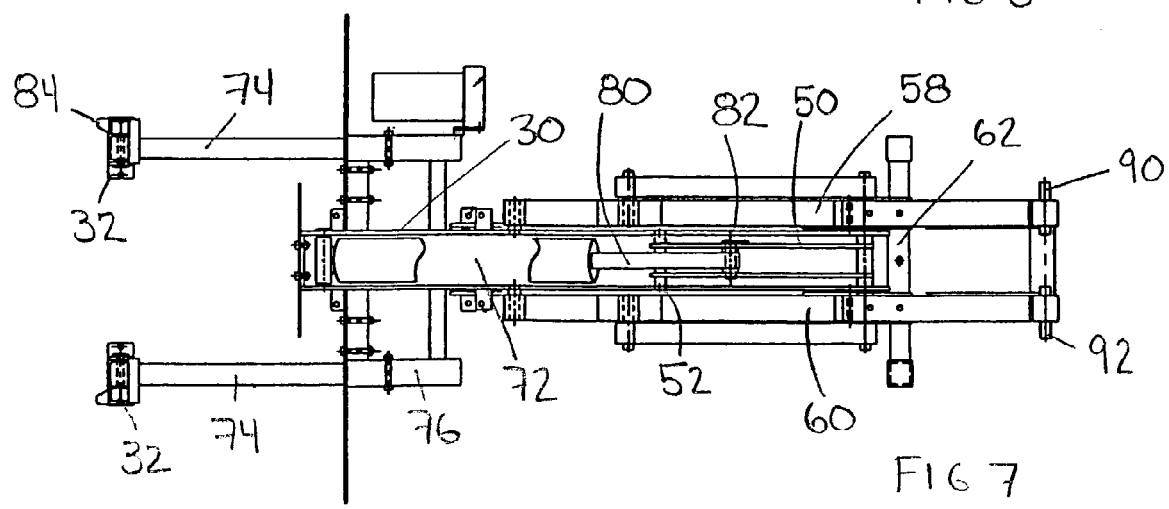

LOW PROFILE MECHANISM FOR STOWING AND DEPLOYING A CARRIAGE WITH RESPECT TO A TRUCK BOX

FIELD OF THE INVENTION

This invention relates generally to the transportation industry, and has to do particularly with improvements in a truck-mounted mechanism adapted to move a load-bearing carriage between a stowed position and a deployed position.

BACKGROUND OF THE INVENTION

Numerous attempts have been made to provide, typically for a pick-up truck, a carriage which fits into the rear box when stowed, and which is associated with a mechanism by which the carriage can be removed from the truck box and set down upon the same surface as that supporting the truck. Such carriages range in use from garbage collecting to the transportation of vehicles such as skidoos or of bulk materials. Generally, the prior art has attempted to over-engineer the various frame members supporting the carriage during its movement, often utilizing several parallelogram linkages, winches and cables, and thus having to deal with the problem of disengaging complex supporting linkages from the carriage, once the carriage is on the ground. These prior carriage-handling mechanisms have been expensive, unreliable and time-consuming to install and maintain, as well as requiring professional operators trained on the sequencing of various controls, sometime in unison, during carriage retraction and deployment.

In addition, prior carriage-handling mechanisms designed for use in pick-up trucks have a high centre-of-gravity when the carriage is in the stowed position. For example, U.S. Pat. Nos. 6,152,674, 5,232,329 and 5,620,296 each describe mechanisms that position the carriage at a level that is at or above the rear box, resulting in a high centre-of-gravity. This can severely affect the controllability of the vehicle, resulting in a safety issue, especially during accident avoidance manoeuvres.

SUMMARY OF THE INVENTION

In view of the above-mentioned shortcomings of the prior art, it is an object of one aspect of this invention to provide a low-profile carriage control mechanism which utilizes a single transfer arm that is easily attached to or detached from one end of the carriage. The other end of the carriage is free to move in any direction, but is constrained by guide rolls to movement which is essentially parallel with the travel direction of the truck. Because the transfer arm is of such simple construction, the apparatus to be described herein is inexpensive, easily mounted and serviced, and reliable to operate.

More particularly, according to an aspect of the present invention, there is provided carriage lifting apparatus for mounting on a box, said lifting apparatus comprising, a horizontal supporting framework having a front end and a rear end;

a generally L-shaped transfer arm having a first arm portion and a second arm portion, said first arm portion having a first end pivotally mounted with respect to an intermediate portion of said framework and a second end pivotally attached to a first end of said second arm portion, said second arm portion having a second end adapted to engage a carriage and said second arm portion being movable with respect to said first arm portion from a folded position to a lockable carriage-ready position, the transfer arm being movable between a stowed position and a deployed position;

a guide means for guiding a carriage, said guide means being mounted towards the rear end of said framework; and a power means for moving the transfer arm between said stowed and deployed positions, said power means being mounted about a pivot towards the rear end of said framework, whereby, said folded position of said second arm permits said lifting apparatus to be compactly folded when said box is empty of a carriage, allowing for placement of a cover over the box, and whereby during operation of the lifting apparatus with a carriage, as the transfer arm begins to move away from the stowed position about an arc to the deployed position, a carriage is moved from said box to a receiving surface.

According to a further aspect of the present invention, there is provided, in combination, a carriage having a front end, a rear end and a wheel means mounted adjacent the rear end thereof;

a box for receiving said carriage; and a lifting apparatus mounted on a box, said lifting apparatus comprising, a generally L-shaped transfer arm having a first arm portion and a second arm portion, said first arm portion having a first end pivotally mounted with respect to an intermediate portion of said framework and a second end pivotally attached to a first end of said second arm portion, said second arm portion having a second end adapted to engage a carriage and said second arm portion being movable with respect to said first arm portion from a folded position to a lockable carriage-ready position, the transfer arm being movable between a stowed position and a deployed position;

a guide means for guiding a carriage, said guide means being mounted towards the rear end of said framework; and a power means for moving the transfer arm between its said positions, said power means being mounted about a pivot towards the rear end of said framework, whereby, said folded position of said second arm permits said lifting apparatus to be compactly folded when said box is empty of a carriage, allowing for placement of a cover over the box, and whereby during operation of the lifting apparatus with a carriage, as the transfer arm begins to move away from the stowed position about an arc to the deployed position, a carriage is moved from said box to a receiving surface.

According to another aspect of the present invention, there is provided a method of deploying from a box a carriage having a front end and a rear end, said method comprising the steps:

providing a lift apparatus mounted within said box, said lift apparatus having a generally L-shaped transfer arm with a first arm portion and a second arm portion, said first arm portion having a first end pivotally mounted with respect to a horizontal supporting framework and a second end pivotally attached to a first end of said second arm portion, said second arm portion having a second end adapted to engage a carriage, said second arm portion being movable from a folded position to a lockable carriage-ready position, the transfer arm being movable between a stowed position and a deployed position, the horizontal supporting framework having a guide means mounted thereon, the carriage having track means thereunder for engaging the guide means, the carriage further having wheel means adjacent the rear end thereof, and utilising power means to positively move the transfer arm between its said positions, such that, as the transfer arm begins to move away from the stowed position, a front end of the carriage lifts upwardly while the carriage moves rearwardly, supported and guided by the guide means until a rearwardly mounted wheel means of the carriage contacts a surface lying below the level of the pivot at the first end of the transfer arm, whereupon the carriage continues to lower and displace backwards relative to said box, the carriage coming to a stop resting on said surface.

BRIEF DESCRIPTION OF THE DRAWINGS

Preferred embodiments of the invention are shown in the drawings wherein:

FIG. 5 is a side elevational view of another embodiment of the present invention, showing the transfer arm in the folded position and with the roller guides retracted.

FIG. 6 is a side elevational view of another embodiment of the lifting apparatus, showing the transfer arm in the carriage-receiving position. The transfer arm is shown in both the stowed position (in dot) and an intermediate position during deployment. The roller guides are shown extended.

FIG. 7 is a top view of another embodiment of the lifting apparatus, showing the transfer arm in the carriage-receiving and stowed positions. The roller guides are shown extended.

FIGS. 8 through 13 are schematic side elevational views of portions of a truck box, a carriage being loaded into or out of the truck box, and a transfer arm which causes movement of the carriage.

DETAILED DESCRIPTION OF THE PREFERRED EMBODIMENTS

Figure 1:
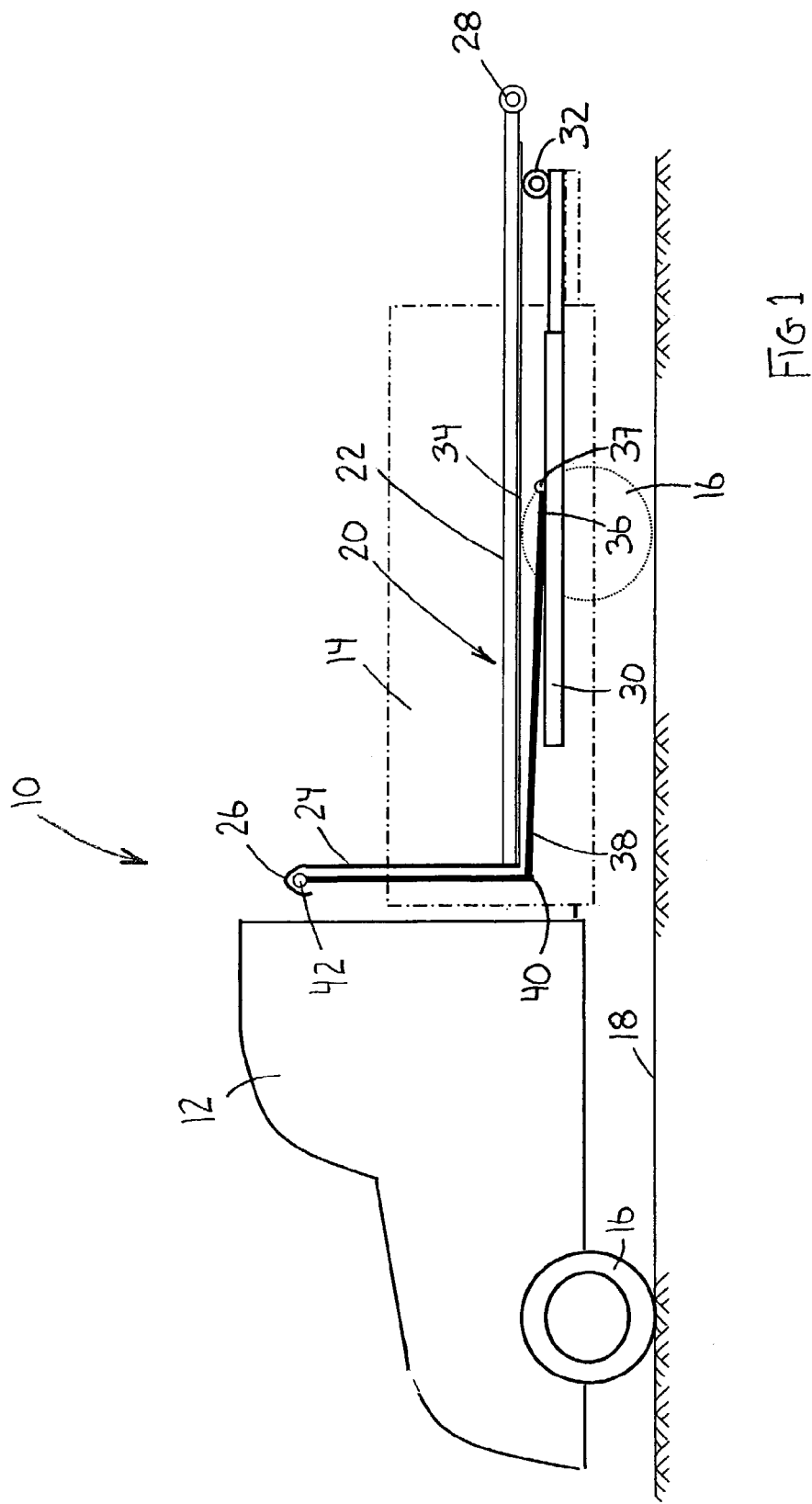
FIG. 1 is a schematic elevational view of a truck, showing the major components of the mechanism to be disclosed herein

Shown in FIG. 1 is a truck 10 having a cab 12, a box 14, and wheels 16. The truck rests on a surface 18. Positioned within the box 14 is a carriage 20. The carriage 20 in FIG. 1 is shown with only its basic structural parts, namely a bottom surface 22, a front vertical wall 24, a hook-shaped member 26 at the top of the vertical wall 24, and a pair of laterally separated wheels 28 at the rearward edge of the carriage 20.

The lifting apparatus of the present invention includes a horizontal supporting framework 30, which supports two spaced-apart roller guides 32. The carriage 20 may include, mounted under the bottom surface 22, a pair of tracks 34 separated by the same distance that separates the roller guides 32, so that the roller guides can ride in the tracks during stowing or deployment, as will be evident in the description that follows. Although not a preferred embodiment, the lifting apparatus of the present invention could be used without the supporting framework with attachment of the operating elements directly to the box.

Pivoted with respect to the horizontal supporting framework 30 is one end 36 of a transfer arm 38, the transfer arm being generally L-shaped at location 40, extending upwardly therefrom to an upper edge which defines a bar 42 adapted to be engaged by the hook-shaped member 26 of the carriage 20.

Mechanical/hydraulic means is provided to rotate the transfer arm 38 in a clockwise direction with reference to the orientation shown in FIG. 1, turning about the pivot location 37, and initiating rearward movement of the carriage 20 as the transfer arm 38 starts to pivot.

Figure 2:
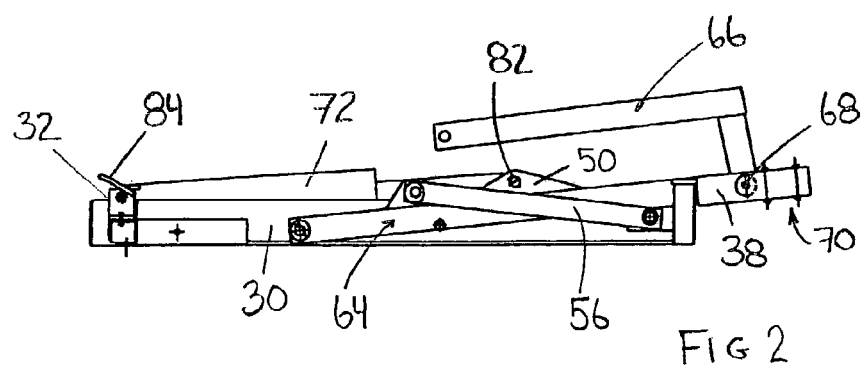
FIG. 2 is a side elevational view of the lifting apparatus, showing the transfer arm in the folded position and with the roller guides retracted.
Figure 3:
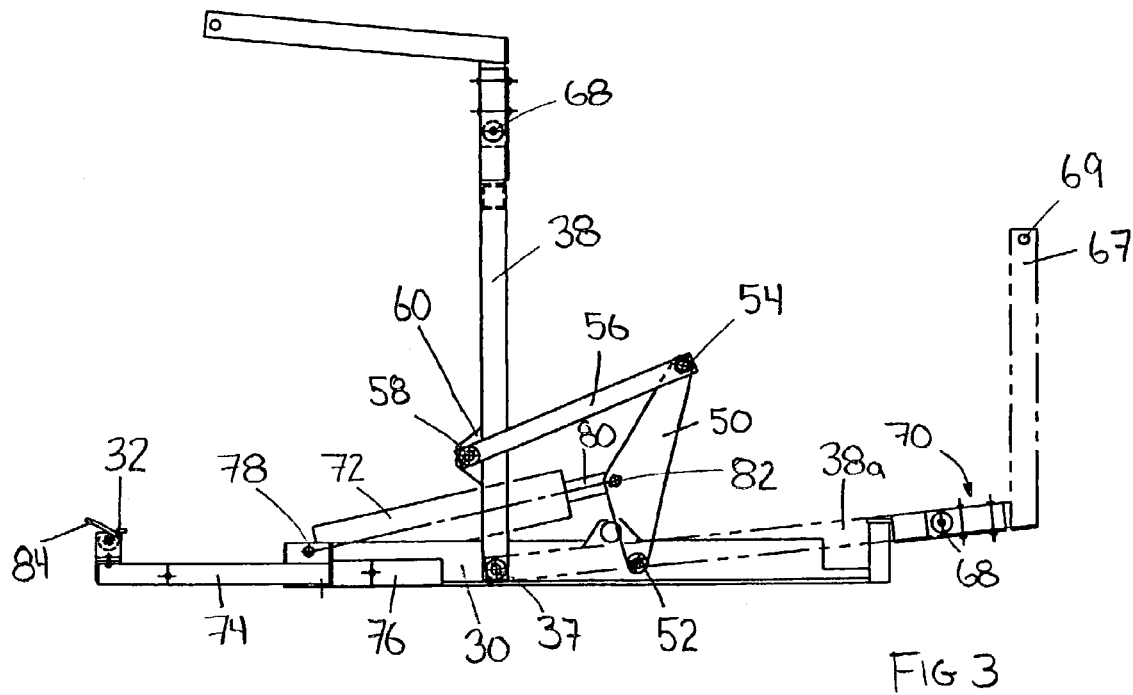
FIG. 3 is a side elevational view of the lifting apparatus, showing the transfer arm in the carriage-receiving position. The transfer arm is shown in both the stowed position (in dot) and an intermediate position during deployment. The roller guides are shown extended.
Figure 4:
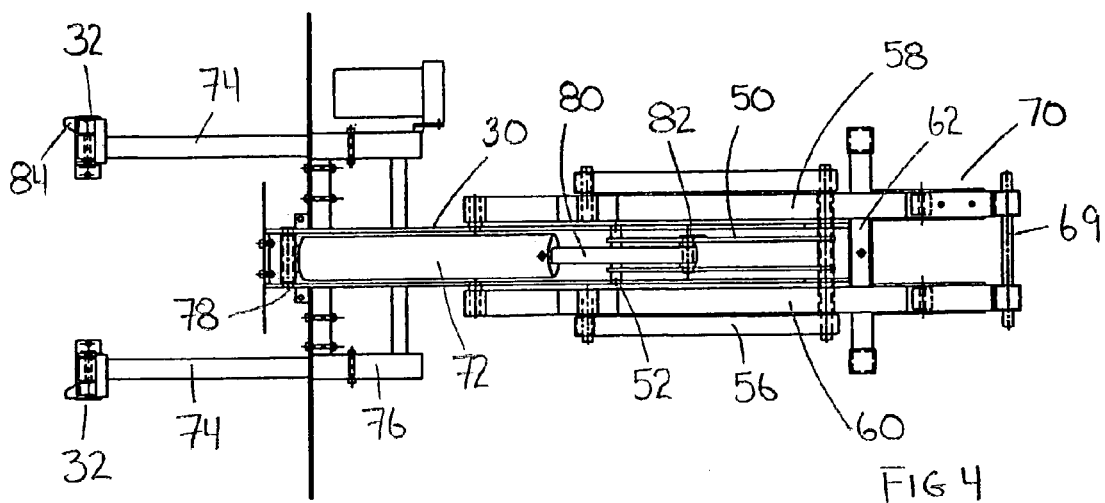
FIG. 4 is a top view of the lifting apparatus, showing the transfer arm in the carriage-receiving and stowed positions. The roller guides are shown extended.

FIGS. 2, 3 and 4 show the mechanism of one embodiment of the invention in greater detail. The lifting apparatus comprises an intermediate lever 50 of which one end is pivoted at 52 to the horizontal supporting framework 30, secured to the truck (see FIG. 3). The other end is pivoted at 54 to one end of a connecting link 56, the other end of the link 56 being pivoted at 58 to a bracket 60 which is secured to and moves with the transfer arm 38. As shown in the top view of FIG. 4, the transfer arm 38 is made up of two parallel members 58, 60 which are maintained in aligned relationship by cross-member 62. The transfer arm 38 is shown as a two piece unit, having a first arm portion 64 and a second arm portion 66 pivotally attached to the first arm portion 64 at location 68. The second arm portion 66 is rotatable from a folded position, as shown in FIG. 2, to a carriage receiving position, as shown in FIG. 3. A locking means 70 is provided to releasably retain the second arm portion 66 in the desired position. The ability to fold the second arm portion 66 downwards in a position that is generally parallel to the first arm portion 64 permits the placement of a cover over the box when the lifting apparatus is not being used to retain a carriage. An example of such a cover on pick-up trucks would be a tonneau cover. The terminal end 67 of the second arm portion 66 of the transfer arm 38 is configured with a horizontal bar 69 for engaging a downwardly open hook 26 (see FIG. 1) forming part of the carriage 20.

At the end opposite the second arm portion 66, there is positioned the roller guides 32. In FIGS. 2, 3 and 4, the roller guides are mounted on respective extending roller guide shafts 74 that slidably extend through corresponding shaft receptacles 76. The ability to slidably extend and retract the roller guides 32 permits the lifting apparatus to fit within length-restricted boxes, such as 'shortbox-style' pick-up trucks.

A hydraulic cylinder 72 is provided, positioned generally rearwardly of transfer arm 38 pivot point 37. The hydraulic cylinder is hinged at point 78 to the horizontal supporting framework 30 secured to the truck. The cylinder 72 houses a piston (not seen) to which is connected a rod 80 pivotally connected at 82 to an intermediate point on the intermediate lever 50.

Starting with a folded lifting apparatus as shown in FIG. 2, to operate the apparatus, the second arm portion 66 of the transfer arm 38 is first rotated from the folded position as shown into a carriage-receiving position as shown in dot in FIG. 3. Using the locking means 70, the second arm portion 66 is locked securely into position. To actuate the transfer arm 38, the hydraulic cylinder retracts the rod 80 leftwardly, causing the intermediate lever 50 to pivot counter-clockwise with respect to the orientation shown in FIGS. 2, 3 and 4, about the pivot point 52, thus pushing leftwardly on the connecting link 56, which in turn causes the transfer arm 38 to rotate counter-clockwise about its pivot location 37. Retraction of rod 80 by the hydraulic cylinder 72 rotates the transfer arm 38 about an arc, defining a first stowed position where a carriage 20 is retained within the box 14, to a final deployed position, where a carriage 20 is placed upon a surface 18. FIG. 3 shows the transfer arm 38 in the stowed position (in dot) as well as at an intermediate point during deployment.

Figure 8:
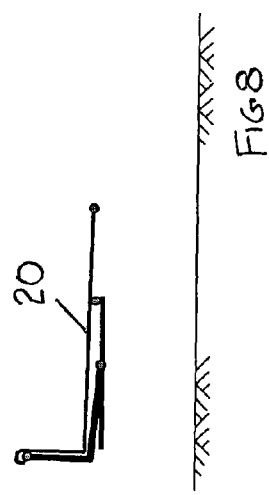
Figure 9:
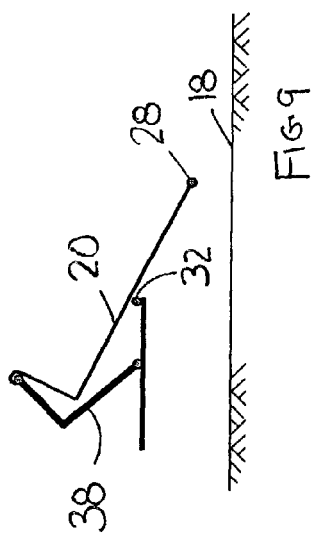
Figure 11:
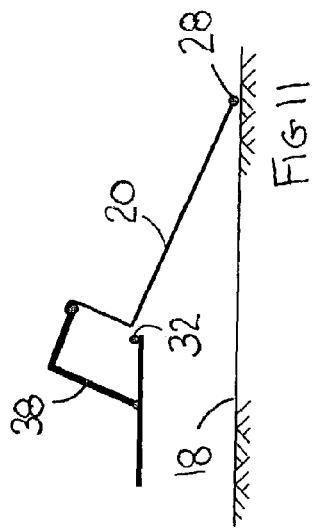
Figure 12:
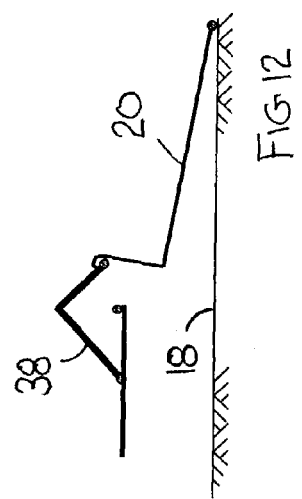
Figure 13:
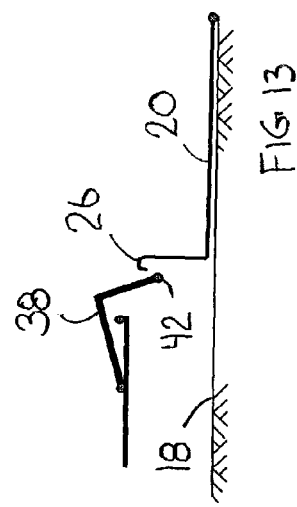

The actual motion of the carriage 20 throughout the process of being removed from the box 14 and set upon the ground 18 is clearly shown in FIGS. 8 to 13. FIG. 8 shows the stowed position of the carriage 20, and thus represents the same position as that shown in FIG. 1. It is to be emphasized that the truck portion which receives the carriage 20 when stowed can be other than the box of a pick-up. For example, the bed of a flatbed truck could also serve as the part accommodating the carriage. In FIG. 9, the transfer arm 38 has rotated approximately 35° clockwise, with reference to the orientation shown in FIGS. 8 to 13, and as can be seen, the carriage 20 has started to move rearwardly and to rotate in the clockwise direction as it does so. This motion continues until the wheels 28 at the rearward end of the carriage 20 touch the surface 18, as seen in FIG. 10. At this point, the carriage disengages from the supporting roller guides 32 and begins to rotate in a counter-clockwise direction as the transfer arm 38 continues its clockwise motion, the wheels 28 now rolling rearwardly and taking a part of the weight of the carriage 20. The mechanism continues to rotate through the positions shown in FIGS. 11 and 12, where the carriage 20 is approaching its final position. The latter is shown in FIG. 13, with the carriage 20 resting on the surface 18. By moving the transfer arm 38 slightly further in the clockwise direction, the bar 42 at the end of the transfer arm 38 disengages from the hook shaped member 26. The truck can now be driven ahead, leaving the disengaged carriage 20 on the surface 18. At the same time, the transfer arm 38 would normally be rotated counter-clockwise back to its original position as seen in FIG. 8. To further reduce the profile of the lifting apparatus, the second arm portion 66 can then be folded downwardly into the folded position, as shown in FIG. 2.

To lock the carriage in its stowed position, the lifting apparatus is further provided with a locking means 84 which is adapted to matingly engage the underside of the carriage 20 (See FIGS. 2, 3 and 4).

Shown in FIGS. 5, 6 and 7 is an alternate embodiment, where the first arm portion 64 is substantially shorter than that shown in FIGS. 2, 3 and 4. Despite the shorter length, this embodiment is designed to maintain the same rotation geometry as the first embodiment shown in FIGS. 2, 3 and 4. This is effectively accomplished by configuring the second arm portion 66 with a longer region 86 adjacent pivot location 68. In addition, this embodiment further comprises a slide mechanism 88 for slidably mounting the horizontal supporting framework 30 to the box 14. With the second arm portion 66 in the folded position, the slide mechanism 88 permits movement of the horizontal supporting framework 30 rightwardly, with respect to the orientation shown in FIG. 5, thus reducing the overall length of the unit when not in use. To permit the second arm portion 66 to maximally fold downwards, the horizontal bar of the first embodiment is replaced by two pins 90, 92 which function to engage the downwardly facing hooks adapted into the carriage structure. To use the lifting apparatus, the horizontal supporting framework 30 is slidingly moved leftwardly, with respect to FIGS. 5 to 7, thus making room for the second arm portion 66 to be rotated downwardly into the carriage-receiving position, as shown in dot in FIG. 6. The lifting apparatus can then be operated as described above for the first embodiment (like reference numerals denoting like structural members).

The purpose for the reduced length of the first arm portion 64 and the slide mechanism 88 is to effectively shorten the footprint of the lifting apparatus so that it may be mounted within boxes of insufficient length to support the more lengthy lifting apparatus of the first embodiment. Sport-truck manufacturers have recently introduced a number of truck formats that have boxes that are shorter than the standard 6 foot length found in 'shortbox-style' pick-up trucks. The lifting mechanism shown in FIGS. 5, 6 and 7 is designed for use with these new truck formats.

While two embodiments of this invention have been illustrated in the accompanied drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. A carriage lifting apparatus for mounting on a box, said lifting apparatus comprising,
   a horizontal supporting framework having a front end and a rear end;
   a generally L-shaped transfer arm having a first arm portion and a second arm portion, said first arm portion having a first end pivotally mounted with respect to an intermediate portion of said framework and a second end pivotally attached to a first end of said second arm portion, said second arm portion having a second end adapted to engage a carriage and said second arm portion being movable with respect to said first arm portion from a folded position to a lockable carriage-ready position, the transfer arm being movable between a stowed position and a deployed position;
   a lock for locking said second arm portion in said lockable carriage-ready position;
   a guide means for guiding a carriage, said guide means being mounted towards the rear end of said framework; and
   a power means for moving the transfer arm between said stowed and deployed positions, said power means being mounted about a pivot towards the rear end of said framework,
   whereby, said folded position of said second arm permits said lifting apparatus to be compactly folded when said box is empty of a carriage, allowing for placement of a cover over the box, and whereby during operation of the lifting apparatus with a carriage, as the transfer arm begins to move away from the stowed position about an arc to the deployed position, a carriage is moved from said box to a receiving surface.

2. The apparatus according to claim 1, wherein said lifting apparatus further comprises a slide mechanism allowing said horizontal supporting framework to slide forwardly and rearwardly with respect to said box.

3. The apparatus according to claim 1, wherein said guide means are roller guides.

4. The apparatus according to claim 1, wherein the box is a rearward, load-bearing portion of a truck, and said surface is the surface supporting the truck.

5. The apparatus according to claim 1, wherein the second end of the second arm portion of the transfer arm is configured with a horizontal bar for engaging a downwardly open hook forming part of a carriage.

6. The apparatus according to claim 1, wherein said guide means is retractable to effectively shorten said apparatus when mounted on a short box.

7. The apparatus according to claim 1, wherein the power means comprises a hydraulic cylinder having a piston and a piston rod.

8. The apparatus according to claim 7, wherein the power means further comprises an intermediate lever having two ends, the lever being pivoted with respect to the framework at one of the ends of the lever, the lever having its other end connected to the transfer arm by a connecting link, the lever being engaged by said the piston rod at an intermediate position between said ends.

9. The apparatus according to claim 7, wherein the power means comprises a hydraulic cylinder having a piston and a piston rod and being pivotally mounted with respect to the rear end of said framework, an intermediate lever having two ends, the lever being pivoted to the framework at one of its ends, having its other end connected to the transfer arm by a connecting link, and being engaged by the piston rod of the cylinder at an intermediate position between said ends.

10. In combination:
a carriage having a front end, a rear end and a wheel means mounted adjacent the rear end thereof;
a box for receiving said carriage; and
a lifting apparatus mounted on a box, said lifting apparatus comprising,
a generally L-shaped transfer arm having a first arm portion and a second arm portion, said first arm portion having a first end pivotally mounted with respect to an intermediate portion of said framework and a second end pivotally attached to a first end of said second arm portion, said second arm portion having a second end adapted to engage a carriage and said second arm portion being movable with respect to said first arm portion from a folded position to a lockable carriage-ready position, the transfer arm being movable between a stowed position and a deployed position;
a lock for locking said second arm portion in said lockable carriage-ready position;
a guide means for guiding a carriage, said guide means being mounted towards the rear end of said framework; and
a power means for moving the transfer arm between its said positions, said power means being mounted about a pivot towards the rear end of said framework,
whereby, said folded position of said second arm permits said lifting apparatus to be compactly folded when said box is empty of a carriage, allowing for placement of a cover over the box, and whereby during operation of the lifting apparatus with a carriage, as the transfer arm begins to move away from the stowed position about an arc to the deployed position, a carriage is moved from said box to a receiving surface.

11. The combination according to claim 10, wherein said lifting apparatus further comprises a slide mechanism allowing said horizontal supporting framework to slide forwardly and rearwardly with respect to said box.

12. The combination according to claim 10, wherein said guide means are roller guides.

13. The combination according to claim 10, wherein the box is a rearward, load-bearing portion of a truck, and said surface is the surface supporting the truck.

14. The combination according to claim 10, wherein the second end of the second arm portion of the transfer arm is configured with a horizontal bar for engaging a downwardly open hook forming part of a carriage.

15. The combination according to claim 10, wherein said guide means is retractable to effectively shorten said apparatus when mounted on a short box.

16. The combination according to claim 10, wherein the power means comprises a hydraulic cylinder having a piston and a piston rod.

17. The combination according to claim 16, wherein the power means further comprises an intermediate lever having two ends, the lever being pivoted with respect to the framework at one of the ends of the lever, the lever having its other end connected to the transfer arm by a connecting link, the lever being engaged by the piston rod at an intermediate position between said ends.

18. The combination according to claim 16, wherein the power means comprises a hydraulic cylinder having a piston and a piston rod and being pivotally mounted with respect to the rear end of said framework, an intermediate lever having two ends, the lever being pivoted to the framework at one of its ends, having its other end connected to the transfer arm by a connecting link, and being engaged by the piston rod of the cylinder at an intermediate position between said ends.

19. A method of deploying from a box a carriage having a front end and a rear end, said method comprising the steps:
providing a lift apparatus mounted within said box, said lift apparatus having a generally L-shaped transfer arm with a first arm portion and a second arm portion, said first arm portion having a first end pivotally mounted with respect to a horizontal supporting framework and a second end pivotally attached to a first end of said second arm portion, said second arm portion having a second end adapted to engage a carriage, said second arm portion being movable from a folded position to a lockable carriage-ready position, the transfer arm being movable between a stowed position and a deployed position, the transfer arm having a lock for locking said second arm portion in said lockable carriage-ready position, the horizontal supporting framework having a guide means mounted thereon, the carriage having track means thereunder for engaging the guide means, the carriage further having wheel means adjacent the rear end thereof,
and utilising power means to positively move the transfer arm between its said positions, such that, as the transfer arm begins to move away from the stowed position, a front end of the carriage lifts upwardly while the carriage moves rearwardly, supported and guided by the guide means until a rearwardly mounted wheel means of the carriage contacts a surface lying below the level of the pivot at the first end of the transfer arm, whereupon the carriage continues to lower and displace backwards relative to said box, the carriage coming to a stop resting on said surface.

20. The method according to claim 19, wherein said lifting apparatus further comprises a slide mechanism allowing said horizontal supporting framework to slide forwardly and rearwardly with respect to said box.

21. The method according to claim 19, wherein said guide means are roller guides.

22. The method according to claim 19, wherein the box is a rearward, load-bearing portion of a truck, and said surface is the surface supporting the truck.

23. The method according to claim 19, wherein the second end of the second arm portion of the transfer arm is configured with a horizontal bar for engaging a downwardly open hook forming part of the carriage.

24. The method according to claim 19, wherein said guide means is retractable to effectively shorten said apparatus when mounted on a short box.

25. The method according to claim 19, wherein the power means comprises a hydraulic cylinder having a piston and a piston rod.

26. The method according to claim 25, wherein the power means further comprises an intermediate lever having two ends, the lever being pivoted with respect to the framework at one of the ends of the lever, the lever having its other end connected to the transfer arm by a connecting link, the lever being engaged by the piston rod at an intermediate position between said ends.

27. The method according to claim 25, wherein the power means comprises a hydraulic cylinder having a piston and a piston rod and being pivotally mounted with respect to the rear end of said framework, an intermediate lever having two ends, the lever being pivoted to the framework at one of its ends, having its other end connected to the transfer arm by a connecting link, and being engaged by the piston rod of the cylinder at an intermediate position between said ends.

* * * * *